United States Patent
Singh et al.

(10) Patent No.: US 9,990,013 B2
(45) Date of Patent: Jun. 5, 2018

(54) SYSTEM AND METHOD FOR FACILITATING OPTIMIZATION OF COOLING EFFICIENCY OF A DATA CENTER

(71) Applicant: Tata Consultancy Services Limited, Mumbai (IN)

(72) Inventors: Umesh Singh, Pune (IN); Harshad Girish Bhagwat, Pune (IN); Sankara Narayanan D, Chennai (IN); Arun Varghese, Chennai (IN); Amarendra Kumar Singh, Pune (IN); Rajesh Jayaprakash, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 146 days.

(21) Appl. No.: 15/100,209

(22) PCT Filed: Nov. 21, 2014

(86) PCT No.: PCT/IB2014/066229
§ 371 (c)(1),
(2) Date: May 27, 2016

(87) PCT Pub. No.: WO2015/079366
PCT Pub. Date: Jun. 4, 2015

(65) Prior Publication Data
US 2017/0023992 A1    Jan. 26, 2017

(30) Foreign Application Priority Data
Nov. 29, 2013    (IN) .......................... 3758/MUM/2013

(51) Int. Cl.
*G05D 23/00*    (2006.01)
*G06F 1/20*    (2006.01)
(Continued)

(52) U.S. Cl.
CPC ................ *G06F 1/20* (2013.01); *G06F 11/00* (2013.01); *G06F 17/5009* (2013.01); *G05B 2219/50333* (2013.01); *G06F 2217/80* (2013.01)

(58) Field of Classification Search
CPC ............ H05K 7/20745; H05K 7/20836; G06F 17/5009; G06F 1/20; G06F 2217/80; G05B 13/041; G05B 2219/50333
(Continued)

(56) References Cited

U.S. PATENT DOCUMENTS

2003/0158718 A1   8/2003   Nakagawa et al.
2007/0174024 A1*  7/2007   Rasmussen ............... G06F 1/20
                                                              703/1
(Continued)

OTHER PUBLICATIONS

Chen et al., "A High-Fidelity Temperature Distribution Forecasting System for Data Centers", Research Gate, Real-Time Systems Symposium (RTSS), 11 Pages, (2012), IEEE, https://www.researchgate.net/publication/261333293_A_High-.
(Continued)

*Primary Examiner* — Michael J Brown
(74) *Attorney, Agent, or Firm* — Finnegan, Henderson, Farabow, Garrett & Dunner LLP

(57) ABSTRACT

Disclosed is a system and method for facilitating optimizing cooling efficiency of a data center. The method may comprise receiving a layout of the data center. The method may comprise computing co-ordinates of each equipment of a plurality of equipments associated with the data center. Further, the method may comprise segregating the layout into a plurality of cells. The method may comprise capturing preliminary data associated with the data center. Further, the method may comprise determining a state value of the data center based upon the preliminary data. The method may comprise capturing CFD data and, selectively, thermal
(Continued)

assessment data. Further, the method may comprise facilitating the optimization of the cooling efficiency of the data center by using an external analysis tool capable of performing Computational Fluid Dynamics (CFD) analysis or thermal assessment followed by the Computational Fluid Dynamics (CFD) analysis using the CFD data and the thermal assessment data.

18 Claims, 8 Drawing Sheets

(51) Int. Cl.
*G06F 11/00* (2006.01)
*G06F 17/50* (2006.01)

(58) Field of Classification Search
USPC .................................................. 700/299, 300
See application file for complete search history.

(56) References Cited

U.S. PATENT DOCUMENTS

| | | |
|---|---|---|
| 2008/0174954 A1* | 7/2008 | VanGilder .......... H05K 7/20745 361/679.54 |
| 2008/0288193 A1 | 11/2008 | Claassen et al. |
| 2011/0040532 A1 | 2/2011 | Hamann et al. |
| 2011/0100618 A1 | 5/2011 | Carlson |
| 2011/0263193 A1 | 10/2011 | Patel et al. |
| 2012/0245905 A1 | 9/2012 | Dalgas et al. |
| 2013/0096905 A1 | 4/2013 | Iyengar et al. |

OTHER PUBLICATIONS

International Search Report, from the U.S. Patent and Trademark Office in corresponding PCT Application No. PCT/IB2014/066229, dated May 22, 2015.
Written Opinion of the International Searching Authority from the U.S. Patent and Trademark Office for International Application PCT/IB2014/066229, dated May 22, 2015.

* cited by examiner

SYSTEM AND METHOD FOR FACILITATING OPTIMIZATION OF COOLING EFFICIENCY OF A DATA CENTER

CROSS-REFERENCE TO RELATED APPLICATIONS AND PRIORITY

The present application does not claim priority from any patent application.

TECHNICAL FIELD

The present disclosure described herein, in general, relates to a data center, and more particularly to a system and method for facilitating optimization of cooling efficiency in a data center.

BACKGROUND

A typical data center may contain Information Technology (IT) equipments including servers, telecommunication equipments, networking equipments, switches and the like. The IT equipments may be arranged on racks or frames in the data center. The IT equipments may generate heat as a result of being utilized for processing of various actions and tasks. The heat generated by the IT components may therefore need to be compensated in order to avoid heating or generating a hot-spot in the data center. The IT equipments may be cooled using cooling units such as computer room air conditioners (CRAC) or computer room air handlers (CRAH), wherein each of these cooling units may be deployed in the data center. The CRAC may be at least one of a return-air controlled CRAC, supply controlled CRAC and the like. Further, the cooling of the IT equipments may also be achieved using advanced cooling units such as in-row coolers, rear door coolers, liquid cooled cabinets and chip cooling techniques.

Data centers consume huge amount of energy in operation. Hence, data center owner strives to reduce energy bills. Cooling units constitute to a major portion of this energy. The cooling of the data center by the computer room air conditioners (CRAC) or the computer room air handlers (CRAH) may depend on various factors associated with design and operational parameters of the data center. Inefficient design or operational condition associated with cooling can lead to the occurrences of hot spot at few localized locations or hotter regions inside the data center. In order to mitigate hot spots and hotter regions, the data center administrator may control air supply of the cooling units for cooling of the racks and the servers belonging to the region affected. However, due to the non-intuitiveness and complex nature of the flow involved in the cooling, the cooling units employed this way without clear understanding of the flow phenomenon, may not be adapted efficiently in order to cool the data center. Therefore, the data center may either be over-cooled on under-cooled and hence the cooling efficiency of the data center may be affected. Therefore, the current data center centers may face a problem of optimum cooling and thereby leading to high cooling costs and wastage of energy resources.

One of the methods of optimizing the cooling efficiency includes performing analysis of the current cooling efficiency of the data centers. In order to perform the analysis, temperature data, air flow data, topographical data and inventory data associated with the equipments in the data center is to be analyzed. However, since there may include numerous equipments located in the data center, it is a challenge to identify appropriate equipments corresponding to which data required for the analysis needs to be captured. As a result, data center management systems may capture data from large number of equipments of which the data corresponding to only few types of equipments may be relevant for the analysis. The capturing of redundant data may therefore unnecessary result in storage and computation overheads of the data center management systems performing the analysis of the data center.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present invention. This summary is provided to introduce concepts related to systems and methods for optimizing cooling efficiency of a data center and the concepts are further described below in the detailed description. This summary is not intended to identify essential features of the claimed disclosure nor is it intended for use in determining or limiting the scope of the claimed disclosure.

In one implementation, a system for facilitating optimizing cooling efficiency of a data center is disclosed. In one aspect, the system may comprise a processor and a memory coupled to the processor for executing a plurality of modules present in the memory. The plurality of modules may further comprise a geometry processing module, a data processing module, and a data interfacing module. The geometry processing module may be configured to receive a layout of the data center. The geometry processing module may further be configured to compute co-ordinates of each equipment of a plurality of equipments associated with the data center. The co-ordinates may be computed based upon a distance of each equipment from a reference location in the data center. Furthermore, the geometry processing module may be configured to segregate the layout into a plurality of cells. The layout may be segregated based on the layout. The plurality of cells comprises the plurality of equipments. The data processing module may be configured to capture preliminary data associated with the data center. Further, the data processing module may be configured to determine a state value of the data center based upon the preliminary data. In one aspect, when it is determined that the state value is less than a reference state value, the data processing module may be configured to capture first level thermal assessment data for each equipment in the data center. After the capturing of the first level thermal assessment data, the data processing module may be configured to process the preliminary data and the first level thermal assessment data in order to identify thermal assessment cells from the plurality cells and then capture second level thermal assessment data corresponding to equipments present in the thermal assessment cells. Further, the data processing module may be configured to capture first level CFD data for each equipment in the data center. After, the capturing of the first level CFD data, the data processing module may be configured to process the first level CFD data in order to identify CFD cells from the plurality of cells and then capture second level CFD data corresponding to equipments present in the CFD cells. After the capturing of the second level CFD data, the data processing module may be configured to process the second level CFD data in order to identify a sub-set of the CFD cells and capture third level CFD data corresponding to equipments present in the sub-set of the CFD cells. The data interfacing module may be configured to transmit at least one of the first level thermal assessment data, the second level thermal assessment data, the first level CFD data, the second level CFD data and the third level CFD data to an external analysis tool. Further, the data interfacing module may be configured to facilitate the optimization of the cooling efficiency of the data center using the external analysis tool. The external analysis tool may be capable of performing at least one of a thermal assessment and a Computational Fluid Dynamics (CFD) analysis using the at least one of the first level thermal assessment data, the second level thermal assessment data, the first level CFD data, the second level CFD data and the third level CFD data.

In another implementation, a method for facilitating optimizing cooling efficiency of a data center is disclosed. The method may comprise one or more steps performed via a processor using instructions stored in a memory. The method may comprise receiving a layout of the data center. The method may comprise computing co-ordinates of each equipment of a plurality of equipments associated with the data center. The co-ordinates may be computed based upon a distance of each equipment from a reference location in the data center. Further, the method may comprise segregating the layout into a plurality of cells. The layout may be segregated based on the layout. The plurality of cells comprises the plurality of equipments. The method may comprise capturing preliminary data associated with the data center. Further, the method may comprise determining a state value of the data center based upon the preliminary data. In one aspect, when it is determined that the state value is less than a reference state value, the method may comprise capturing first level thermal assessment data for each equipment in the data center. After the capturing of the first level thermal assessment data, the method may comprise processing the preliminary data and the first level thermal assessment data in order to identify thermal assessment cells from the plurality cells and then capturing second level thermal assessment data corresponding to equipments present in the thermal assessment cells. Further, the method may comprise capturing first level CFD data for each equipment in the data center. After, the capturing of the first level CFD data, the method may comprise processing the first level CFD data in order to identify CFD cells from the plurality of cells and then capturing second level CFD data corresponding to equipments present in the CFD cells. After the capturing of the second level CFD data, the method may comprise processing the second level CFD data in order to identify a sub-set of the CFD cells and capturing third level CFD data corresponding to equipments present in the sub-set of the CFD cells. The method may comprise transmitting at least one of the first level thermal assessment data, the second level thermal assessment data, the first level CFD data, the second level CFD data and the third level CFD data to an external analysis tool. Further, the method may comprise facilitating the optimization of the cooling efficiency of the data center using the external analysis tool. The external analysis tool may be capable of performing at least one of a thermal assessment and a Computational Fluid Dynamics (CFD) analysis using the at least one of the first level thermal assessment data, the second level thermal assessment data, the first level CFD data, the second level CFD data and the third level CFD data.

In yet another implementation, a non-transitory computer program product having embodied thereon a computer program for facilitating optimizing cooling efficiency of a data center is disclosed. The computer program product may comprise instructions for receiving a layout of the data center. The computer program product may comprise instructions for computing co-ordinates of each equipment of a plurality of equipments associated with the data center. The co-ordinates may be computed based upon a distance of each equipment from a reference location in the data center. Further, the computer program product may comprise instructions for segregating the layout into a plurality of cells. The layout may be segregated based on the layout. The plurality of cells comprises the plurality of equipments. The computer program product may comprise instructions for capturing preliminary data associated with the data center. Further, the computer program product may comprise instructions for determining a state value of the data center based upon the preliminary data. In one aspect, when it is determined that the state value is less than a reference state value, the computer program product may comprise instructions for capturing first level thermal assessment data for each equipment in the data center. After the capturing of the first level thermal assessment data, the computer program product may comprise instructions for processing the preliminary data and the first level thermal assessment data in order to identify thermal assessment cells from the plurality cells and then capturing second level thermal assessment data corresponding to equipments present in the thermal assessment cells. Further, the computer program product may comprise instructions for capturing first level CFD data for each equipment in the data center. After, the capturing of the first level CFD data, the computer program product may comprise instructions for processing the first level CFD data in order to identify CFD cells from the plurality of cells and then capturing second level CFD data corresponding to equipments present in the CFD cells. After the capturing of the second level CFD data, the computer program product may comprise instructions for processing the second level CFD data in order to identify a sub-set of the CFD cells and capturing third level CFD data corresponding to equipments present in the sub-set of the CFD cells. The computer program product may comprise instructions for transmitting at least one of the first level thermal assessment data, the second level thermal assessment data, the first level CFD data, the second level CFD data and the third level CFD data to an external analysis tool. Further, the computer program product may comprise instructions for facilitating the optimization of the cooling efficiency of the data center by using the external analysis tool. The external analysis tool may be capable of performing at least one of a thermal assessment and a Computational Fluid Dynamics (CFD) analysis using the at least one of the first level thermal assessment data, the second level thermal assessment data, the first level CFD data, the second level CFD data and the third level CFD data.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
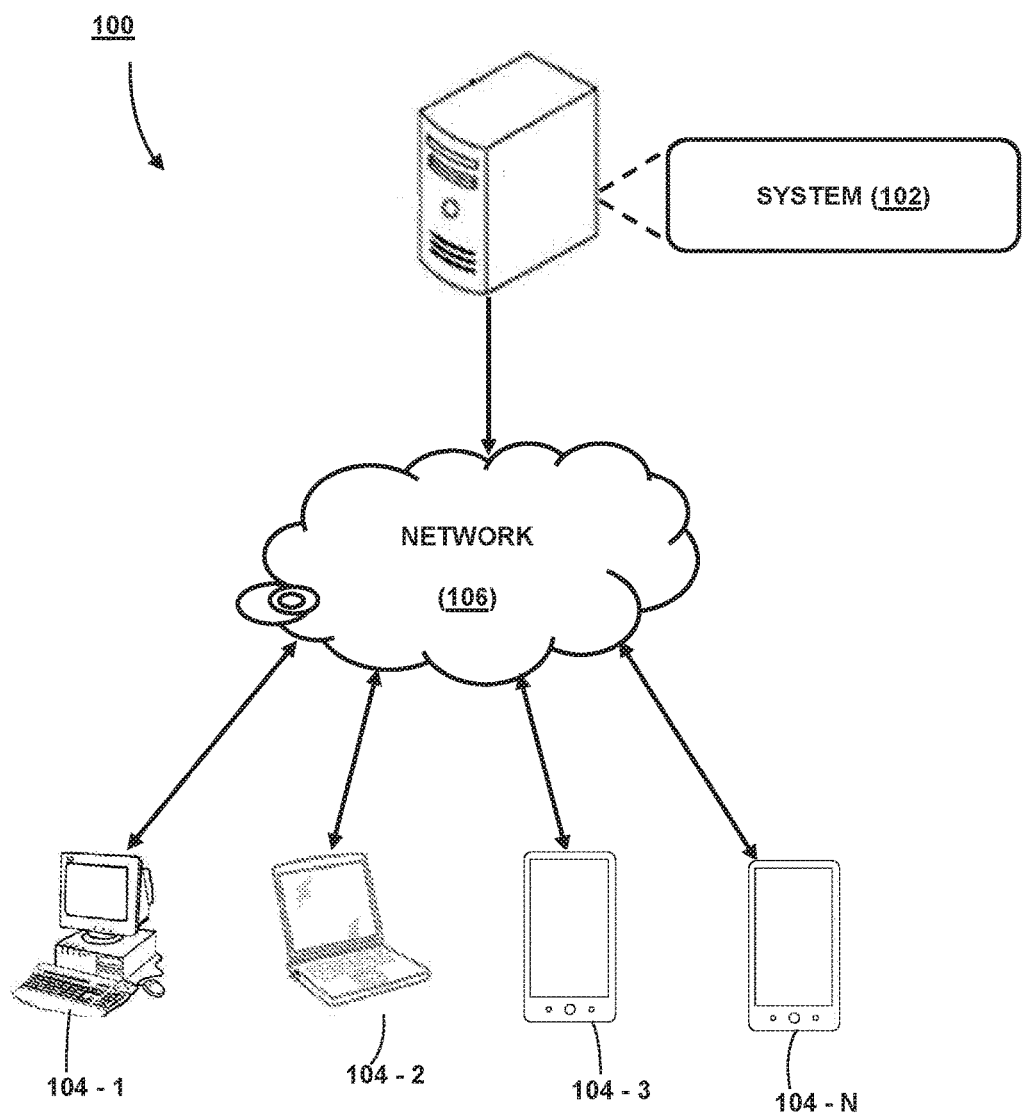
FIG. 1 illustrates a network implementation of a system for facilitating optimizing cooling efficiency of a data center, in accordance with an embodiment of the present disclosure.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiments will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Systems and methods for facilitating optimizing cooling efficiency of a data center are described. In one aspect, a layout of the data center may be received. After the receipt of the layout, co-ordinates of equipments present in the data center may be computed. Further, the layout may be segregated into a plurality of cells to incorporate the equipments in the plurality of cells. In one example, the layout may be segregated based on an aisle in the data center such that the aisle is confined between two adjacent cells.

After the segregation, preliminary data associated with the data center may be captured. Based on the preliminary data, a state value of the data center may be determined. Depending on the state value, it may be determined that whether the cooling efficiency of the data center has to be facilitated by performing only computational fluid dynamics (CFD) analysis or both thermal assessment and the computational fluid dynamics (CFD) analysis.

Based on the state value, if it is determined that the thermal assessment has to be done, a first level thermal assessment data may be captured for each equipment in the data center. Further, the preliminary data along with the first level thermal assessment data is processed in order to identify thermal assessment cells from the plurality cells. Then, second level thermal assessment data corresponding to equipments present in the thermal assessment cells may be captured. It is to be understood that the thermal assessment may be selectively implemented only when the state value is less than a reference state value. Therefore, the capturing of the first level thermal assessment data and the second level thermal assessment data may also be performed selectively. Specifically, when the state value is greater than or equal to the reference state value, the disclosure enables directly performing the CFD analysis. Therefore, the systems and methods of the present disclosure facilitates saving on storage space and reduction in number of computations that are required for analyzing the cooling efficiency.

Depending on the state value, the method and the system of the present disclosure may facilitate direct capturing of CFD data required for CFD analysis, or the CFD data may be preceded by the capturing of the thermal assessment data, as the case may be. In order to capture the data required for the CFD analysis, initially, first level CFD data for each equipment in the data center may be captured. Then the first level CFD data may be processed in order to identify CFD cells from the plurality of cells. After the identification of the CFD cells, second level CFD data corresponding to equipments present in the CFD cells may be captured. Further, the second level CFD data may be processed in order to identify a sub-set of the CFD cells and then capture third level CFD data corresponding to equipments present in the sub-set of the CFD cells. It is to be noticed that since the methods and systems of the present disclosure identifies only sub-set of CFD cells from where the third level CFD data is to be captured, this may further help in saving the storage space. Further, since the data captured is reduced, this facilitates in reduction of number of computations required for analyzing the cooling efficiency of the data center.

Further, the first level thermal assessment data, the second level thermal assessment data, the first level CFD data, the second level CFD data and the third level CFD data may be transmitted to an external analysis tool. Furthermore, the systems and methods may facilitate the optimization of the cooling efficiency of the data center by using the external analysis tool. The external analysis tool may be capable of performing at least one of a thermal assessment and a Computational Fluid Dynamics (CFD) analysis using the at least one of the first level thermal assessment data, the second level thermal assessment data, the first level CFD data, the second level CFD data and the third level CFD data.

It may be observed by a person skilled in the art that since the present disclosure enables identification of appropriate cells and equipment from where the data is to be captured and additionally facilitates selectively performing thermal assessment; lot of data reduction is facilitated thereby conserving the storage space and enhancement in computations required for the CFD analysis and the thermal assessment. Specifically, it may be realized and appreciated that the present disclosure enables the systems and the methods to only capture the first level CFD data, the second level CFD data and the third level CFD data when the state value is greater than or equal to the reference state value. Alternatively, only when the state value is less than the reference state value, the systems and the methods are initially enabled to capture the first level thermal assessment data, the second level thermal assessment data, and then capture the first level CFD data, the second level CFD data and the third level CFD data. Thus, the present disclosure facilitates conserving the storage space and the reduction in the processing time required for the facilitation of the optimization of the cooling efficiency of the data center.

While aspects of described system and method for facilitating optimizing cooling efficiency of the data center may be implemented in any number of different computing systems, environments, and/or configurations, the embodiments are described in the context of the following exemplary system.

Referring now to FIG. 1, a network implementation 100 of a system 102 for facilitating optimization cooling efficiency of a data center is disclosed. The system 102 may receive a layout of the data center. The system 102 may compute co-ordinates of each equipment of a plurality of equipments associated with the data center. The co-ordinates are computed based upon a distance of each equipment from a reference location in the data center. Further, the system 102 may segregate the layout into a plurality of cells. The layout may be segregated based on the layout. The plurality of cells comprises the plurality of equipments. The system 102 may capture preliminary data associated with the data center. Further, the system 102 may determine a state value of the data center based upon the preliminary data. Further, when it is determined that the state value is less than a reference state value, the system 102 may capture first level thermal assessment data for each equipment in the data center. After the capturing of the first level thermal assessment data, the system 102 may process the preliminary data and the first level thermal assessment data in order to identify thermal assessment cells from the plurality cells and then capture second level thermal assessment data corresponding to equipments present in the thermal assessment cells. Further, the system 102 may capture first level CFD data for each equipment in the data center. After, the capturing of the first level CFD data, the system 102 may process the first level CFD data in order to identify CFD cells from the plurality of cells and then capture second level CFD data corresponding to equipments present in the CFD cells. After the capturing of the second level CFD data, the system 102 may process the second level CFD data in order to identify a sub-set of the CFD cells and capture third level CFD data corresponding to equipments present in the sub-set of the CFD cells. The system 102 may transmit at least one of the first level thermal assessment data, the second level thermal assessment data, the first level CFD data, the second level CFD data and the third level CFD data to an external analysis tool. Further, the system 102 may facilitate the optimization of the cooling efficiency of the data center using the external analysis tool. The external analysis tool may be capable of performing at least one of a thermal assessment and a Computational Fluid Dynamics (CFD) analysis using the at least one of the first level thermal assessment data, the second level thermal assessment data, the first level CFD data, the second level CFD data and the third level CFD data.

Although the present disclosure is explained considering that the system 102 is implemented on a server, it may be understood that the system 102 may also be implemented in a variety of computing systems, such as a laptop computer, a desktop computer, a notebook, a workstation, a cloud-based computing environment and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, a Smartphone, a Tablet Computer, a workstation and the like. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
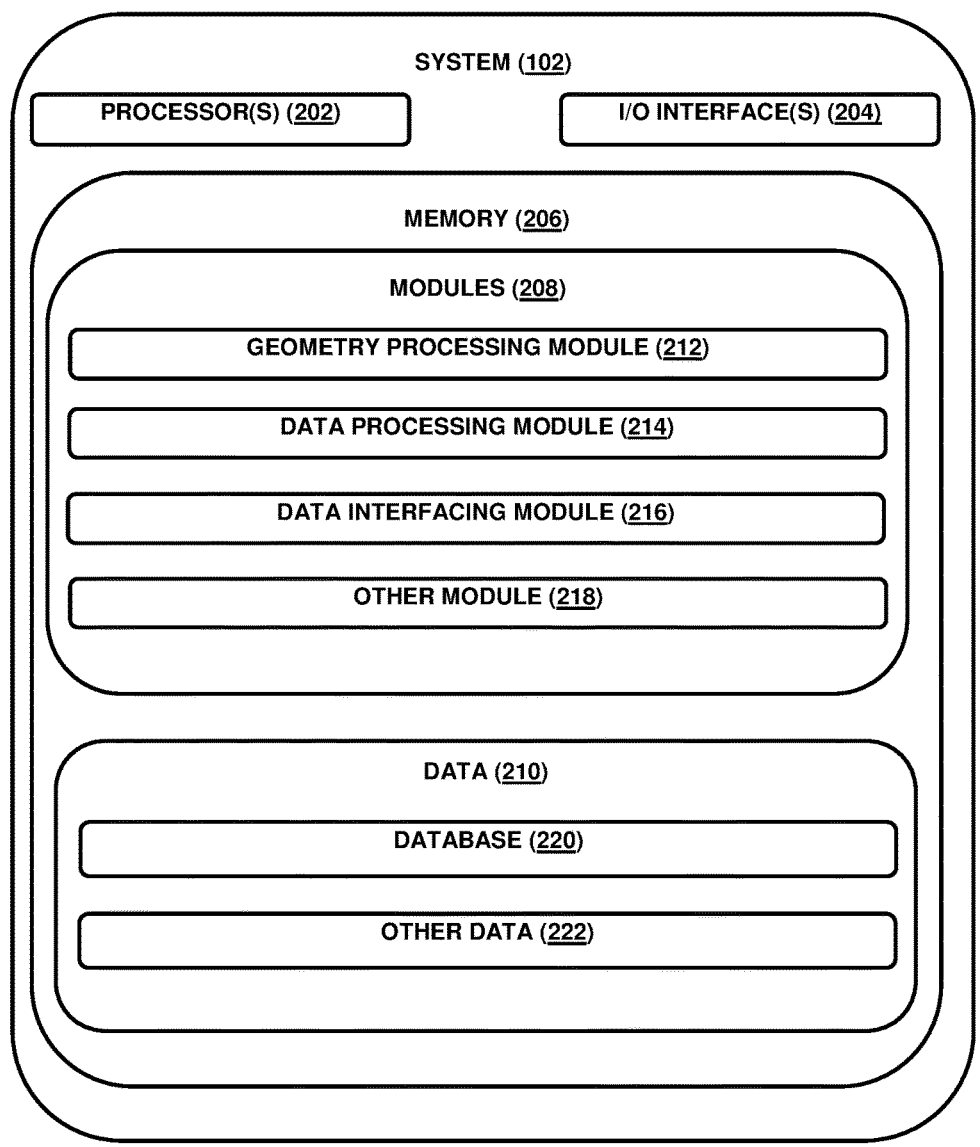
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite and the like. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes, and the like. The memory 206 may include modules 208 and data 210.

The modules 208 include routines, programs, objects, components, data structures, etc., which perform particular tasks, functions or implement particular abstract data types, and the like. In one implementation, the modules 208 may include a geometry processing module 212, a data processing module 214, a data interfacing module 216, and other module 218. The other module 218 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a database 220, and other data 222. The other data 222 may include data generated as a result of the execution of one or more modules in the other module 218.

Figure 3:
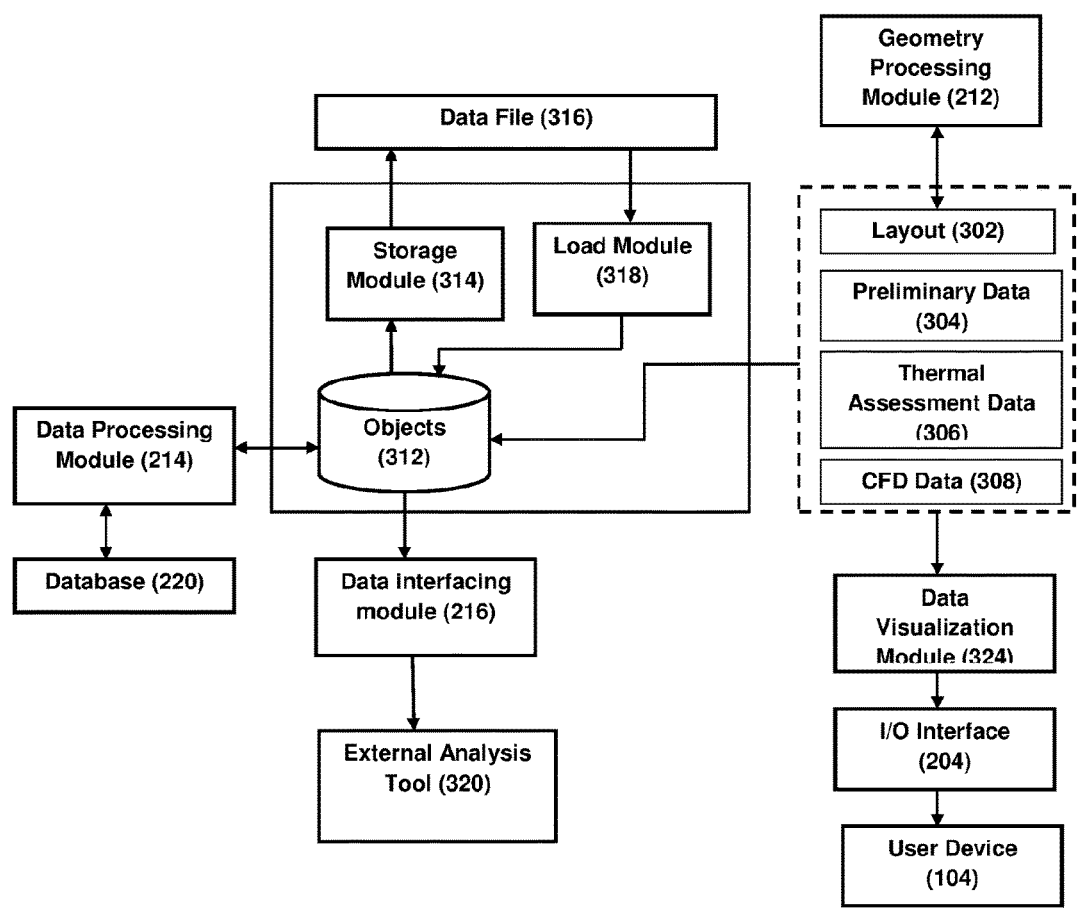
FIG. 3 illustrates various modules of the system, in accordance with an embodiment of the present disclosure.

In one implementation, at first, a user may use one of the user devices 104 to access the system 102 via the I/O interface 204. The user may register themselves using the I/O interface 204 in order to use the system 102. The working of the system 102 may be explained in detail in FIGS. 3, 4, 5, 6, 7 and 8 explained below. Referring to FIG. 3, a detailed working of various modules along with other components of the system 102 is illustrated, in accordance with an embodiment of the present disclosure.

Geometry Processing Module 212

In one embodiment, the functionalities of the geometry processing module 212 have been described referring to FIG. 3. The geometry processing module 212 may be configured to receive layout 302 of the data center. The layout 302 may be received from an external resource (e.g. a data center manager) or may be generated by a user using the system 102. In one embodiment, the layout 302 may be generated by the user using a data visualization module 324 of the system 102 as shown in FIG. 3. The data visualization module 324 may comprise a toolbar containing different components and/or equipments associated to the data center. These components/equipments may be dragged and dropped onto the workspace or drawing area of the layout 302. Further, boundaries may be drawn using drawing tools available in the toolbar. Once the layout 302 is drawn by the user, information about the equipments and/or components may be entered using text boxes, check boxes and radio buttons present in the properties panel of the data visualization module 324. The layout 302 may depict arrangement of a plurality of equipments in the data center. The plurality of equipments may comprise a Computer Room Air Conditioner (CRAC), a networking device, a storage device, a switch, a heat dissipating device, and a rack housing the heat dissipating device and the like. The geometry processing module 212 may be configured to compute co-ordinates of each equipment of a plurality of equipments. In an embodiment, the co-ordinates of each equipment are computed based upon a distance of each equipment from a reference location in the data center. In one example, the reference location may indicate origin of the data center. Further, the geometry processing module 212 may be configured to segregate the layout into a plurality of cells based on information associated with the layout. In an embodiment, the layout 302 is segregated into the plurality of cells based on the size of each cell of the plurality of cells, or an aisle in the data center or geometry associated with the data center and the like. In one example, the segregation of the layout 302 is implemented based on the aisles such that each aisle is confined between two adjacent cells. Alternatively, in another example, the segregation of the layout 302 may be based on particular region or area in the data center such that equipments located in the particular region or the area may be grouped into a single cell. After the segregation, the layout 302 may be stored in the memory of the system 102 in form of objects 312 as illustrated.

Data Processing Module 214

After the receipt of the layout 302, data required for analysis of the cooling efficiency may captured by the data processing module 214. Initially, the data processing module 214 may be configured to capture preliminary data 304 associated with the data center. In an embodiment, the preliminary data 304 comprises information of the plurality of equipments, information of racking practices of the rack, power consumed by the data center, power consumed by the one or more equipments, operational parameters of the plurality of equipments, leakage in a plenum of the data center, blockage in the plenum of the data center, openings in the rack, temperature associated with each equipment, air velocity associated with each equipment and the like. In one example, the preliminary data may comprise:

Data center power which is captured via a power sensor.

IT power (power consumed by each equipment) which is captured, via the power sensor.

Gross Leakage: Number of leakages and average size of leakage.

Gross Blockage: Number of blockages and average size of blockage.

Gross rack openings: Average openings in each rack.

CRAC Information including location, model number, cooling capacity, and ON/OFF status of each CRAC.

Rack Information including type of servers placed inside the racks such as, networking equipment, high end blade server, storage equipment, and switch equipment etc General Information of the data center. It should be noted to a person ordinary skilled in the art that the preliminary data disclosed above is exemplary, and is not intended to limit the scope of the appended claims.

Subsequent to the capturing of the preliminary data 304, the preliminary data 304 may be stored in the memory of the system 102 in form of objects 312 as illustrated. Further, the data processing module 214 may be configured to process the preliminary data in order to determine a state value of the data center. The preliminary data 304 may be processed to compute state metrics that may be analyzed to determine the state value of the data center. The state metrics computed may comprise:

Power usage effectiveness (PUE): The Power usage effectiveness (PUE) may be a ratio of the data center power and the IT power.

Lumped ratio: The Lumped ratio may be a ratio of cooling capacity of the data center to the heat generated in the data center. The cooling capacity may be a sum of cooling capacities of a running CRAC or all CRACs installed in the data center. The heat generated may be an actual or maximum heat generated in the data center.

Gross % leakage area: The Gross % leakage area may indicate an approximate percentage ratio of leakage area to the area of the data center.

Gross % plenum blockage: The Gross % plenum blockage may indicate an approximate percentage ratio of plenum volume blocked by underfloor blockage to the volume of plenum.

Set points level: The set points level may be indicative of maximum and minimum of temperature set points of each CRAC.

Average ambient temperature: The average ambient temperature may indicate an average value of ambient temperature obtained at a location of the data center over the year. It should be noted to a person ordinary skilled in the art that the state metrics disclosed above are exemplary, and is not intended to limit the scope of the appended claims.

In one embodiment, the aforementioned state metrics may be analyzed by the data processing module 214 in order to determine the state value of the data center. In order to determine the state value, initially, a weight may be assigned to each of the state metrics. Then, each of the state metrics may be normalized based on maximum value of each metrics. In one example, each state metric may be normalized to a value ranging 0 to 1. After the normalization, each state metric may be multiplied with the weight assigned. Finally, the state value of the data center may be determined based on sum of all the multiples computed for the state metrics. It is to be understood and realized by one skilled in the art that the determination of the state value as described in the above embodiment is exemplary and other methods/techniques may also be utilized to determine the state value. For example, in some embodiments, the state value may also be determined using various other mathematical and/or statistical methods and/or techniques known in the art.

In one embodiment, after the determination of the state value, the data processing module 214 may be configured to recommend further steps of data capturing which may required for facilitating the optimization of the cooling efficiency of the data center. The data processing module 214 may recommend the further steps of the data capturing by comparing the state value with a reference state value. In one example, when the state value is greater than or equal to the reference state value, the data processing module 214 may recommend directly capturing the CFD data 308 required for performing CFD analysis. Alternatively, when the state value is less than the reference state value, the data processing module 214 may initially recommend capturing the thermal assessment data 306 and then the capturing of the CFD data 308 after the capturing of the thermal assessment data 306. The detail description of the capturing of the CFD data 308 and the thermal assessment data 306 is described as below.

Subsequent to the determination of the state value, when it is determined that the state value is less than the reference state value, the data processing module may be configured to capture the thermal assessment data 306 as shown in FIG. 3. The capturing of the thermal assessment data 306 may comprise capturing a first level thermal assessment data and a second level thermal assessment data. In an embodiment, the first level thermal assessment data may be captured for each equipment of the plurality of equipments in the data center. Specifically, the first level assessment data may be associated with each cell of the plurality of cells on the layout 302. In an embodiment, the first level thermal assessment data may comprise first level thermal assessment topographical data, first level temperature data, first level flow data, and the like. Further, the first level thermal assessment topographical data may be associated with at least one of a leakage, a blockage, an opening corresponding to each cell of the plurality of cells, and the like. In one example, the first level thermal assessment topographical data, the first level temperature data and the first level flow data may be captured for a shorter duration. The first level temperature data and the first level flow data may include a single temperature value and a single air flow value respectively which may be captured for each rack. Similarly, the first level thermal assessment topographical data include leakage level, blockage level, opening level in each cell of the plurality of cells, and the like. In an embodiment, the system 102, via a data visualization module 324, may interactively display on the I/O Interface 204 locations from where the first level thermal assessment data is to be captured corresponding to each cell. The locations may be identified based on the co-ordinates computed for the equipments by the geometry processing module 212. Further, the locations may be identified based on the size along with the co-ordinates of the equipments.

Subsequent to the capturing of the first level thermal assessment data, the data processing module 214 may be configured to process the first level thermal assessment data along with the preliminary data 304 in order to identify a first sub-set of the plurality of cells, hereinafter referred to as thermal assessment cells, corresponding to which a second level thermal assessment data is to be captured. In an embodiment, the first level thermal assessment data along with the preliminary data 304 are processed to compute thermal assessment metrics associated with the plurality of cells. The thermal assessment metrics may then be analyzed in order to identify the thermal assessment cells. In one example, the thermal assessment metrics computed may comprise:

$$T1 = T_{Rack} - T_{Tile} \text{ and } T2 = T_{Rack} - T_{Threshold}$$

Wherein, $T_{Rack}$ indicates temperature measured at inlet of a rack,
$T_{Tile}$ indicates temperature measured at a tile, and
$T_{Threshold}$ indicates temperature recommended by manufacturers of equipment residing in the rack as maximum temperature at which safe operation of the said equipment is ensured.

First level thermal assessment Opening %: The first level thermal assessment Opening % may indicate an approximate percentage of open frontal area to the total frontal area of rack averaged over all racks for each cell.

First level thermal assessment Leakage %: The first level thermal assessment Leakage % may indicate an approximate percentage ratio of leakage area to the cell area for each cell.

First level thermal assessment blockage %: The first level thermal assessment blockage % may indicate an approximate percentage ratio of plenum volume blocked by under floor blockage under the cell to the volume of plenum for each cell.

In one embodiment, the aforementioned thermal assessment metrics may be analyzed in order to identify the thermal assessment cells. In one embodiment, each of the thermal assessment metrics may be assigned a weight in order to calculate a cell state level. In one example, consider the weight assigned for each thermal assessments metrics in one or more cells is as below:

$\Delta T1 = 0.3$, $\Delta T2 = 0.3$,

First level thermal assessment Opening %=0.2,
First level thermal assessment leakage %=0.2,
First level thermal assessment blockage %=0.2.

Now, consider that if the cell state level is greater than 0.8 then at that particular cell, second level thermal assessment may be required to be captured. Therefore, considering the current example, the state value is 0.9, which is greater than 0.8, and thus, for the present case scenario, the one or more cells may be identified as the thermal assessment cells and thus for these cells, the capturing of the second level thermal assessment may be required. Moreover on addition to these cells, racks which has $\Delta T2 > 5°$ C., then at those racks, details of openings, blockage inside the rack may be captured. In an embodiment, the granularity of data being captured corresponding to the thermal assessment cells is higher. Specifically, the second level thermal assessment data comprising second level thermal assessment topographical data, second level temperature data and second level flow data may be captured for a longer duration as compared to the first level thermal assessment topographical data, the first level temperature data and the first level flow data. Further, level of geometrical details captured corresponding to the thermal assessment cells may be at minute or granular level. More particularly, the second level thermal assessment data comprise capturing second level thermal assessment blockage, second level thermal assessment leakage, second level thermal assessment containment, second level thermal assessment flow availability factor corresponding to each of the thermal assessment cells, and the like. The Flow Availability Factor is a ratio of sum of flow rates of tiles in a cell to flow requirement of racks in the same cell. Total Flow availability factor is the average of all such ratios calculated for all the aisles in the data center. In an embodiment, the system 102, via the data visualization module 324, may interactively display on the I/O Interface 204 locations from where the second level thermal assessment data is to be captured corresponding to each cell of the thermal assessment cells.

It may be understood that the capturing of the thermal assessment data 306 may be selectively implemented by the data processing module 214, and therefore may be optional depending on the state value of the data center. It may be noted that the thermal assessment data 306 is selectively captured only when the state value is less than the reference state value. Alternatively, the data processing module 214 may directly recommend and proceed for the capturing of the CFD data 308. Further, the person skilled in the art would realize that the data processing module 214 may first capture the thermal assessment data 306, as explained above and then proceed for the capturing of the CFD data 308, when the state value is less than the reference state value. The capturing of the CFD data 308 is further explained in detail as below referring the FIG. 3.

In an embodiment, depending on the state value, the data processing module 214 may be configured to capture the CFD data 308 either directly or after the capturing of the thermal assessment data 306, as the case may be. The capturing of the CFD data 308 may comprise capturing a first level CFD data, a second level CFD data and a third level CFD data. The data processing module 214 may be configured to capture the first level CFD data corresponding to each equipment present in each cell of the plurality of cells. Specifically, the first level CFD data may comprise CFD topographical data that is associated with at least one of a leakage, a blockage details of containment such as size, containment type, level of containment corresponding to each cell of the plurality of cells, and the like. The data processing module 214 may then be configured to process the first level CFD data in order to compute a first level CFD metrics associated to each cell of the plurality of cells. Further, based on the first level CFD metrics, the data processing module 214 may identify a second sub-set of the plurality of cells, hereinafter referred to as CFD cells, corresponding to which a second level CFD data is to be captured. In one embodiment, after the identification of the CFD cells, the data processing module 214 may be configured to capture the second level CFD data corresponding to the CFD cells identified out of the plurality of cells. The CFD cells indicate the locations in the data center, wherein data needs to be captured at a higher granular level. In one embodiment, the second level CFD data may comprise first level CFD temperature data and first level CFD flow data to be captured corresponding to the CFD cells. Further, the second level CFD data may be processed in order to compute a second level CFD metrics. Then based on the second level CFD metrics, the data processing module 214 may be configured to identify a sub-set of the CFD cells indicative of locations in the data center from which the third level CFD data is to be captured. In one embodiment, the third level CFD data may comprise second level CFD temperature data and second level CFD flow data to be captured corresponding to the sub-set of the CFD cells. The sub-set of the CFD cells indicates the locations in the data center, wherein data needs to be captured at a finer level as compared to the second set of CFD data. In an embodiment, the system 102, via the data visualization module 324, may interactively display on the I/O Interface 204 locations from where the first level CFD data, the second level CFD data and the third level CFD data are to be captured corresponding to respective cells identified from the plurality of cells. The examples of the capturing of the CFD data 308 are further described below referring to FIGS. 4 and 5.

Figure 4:
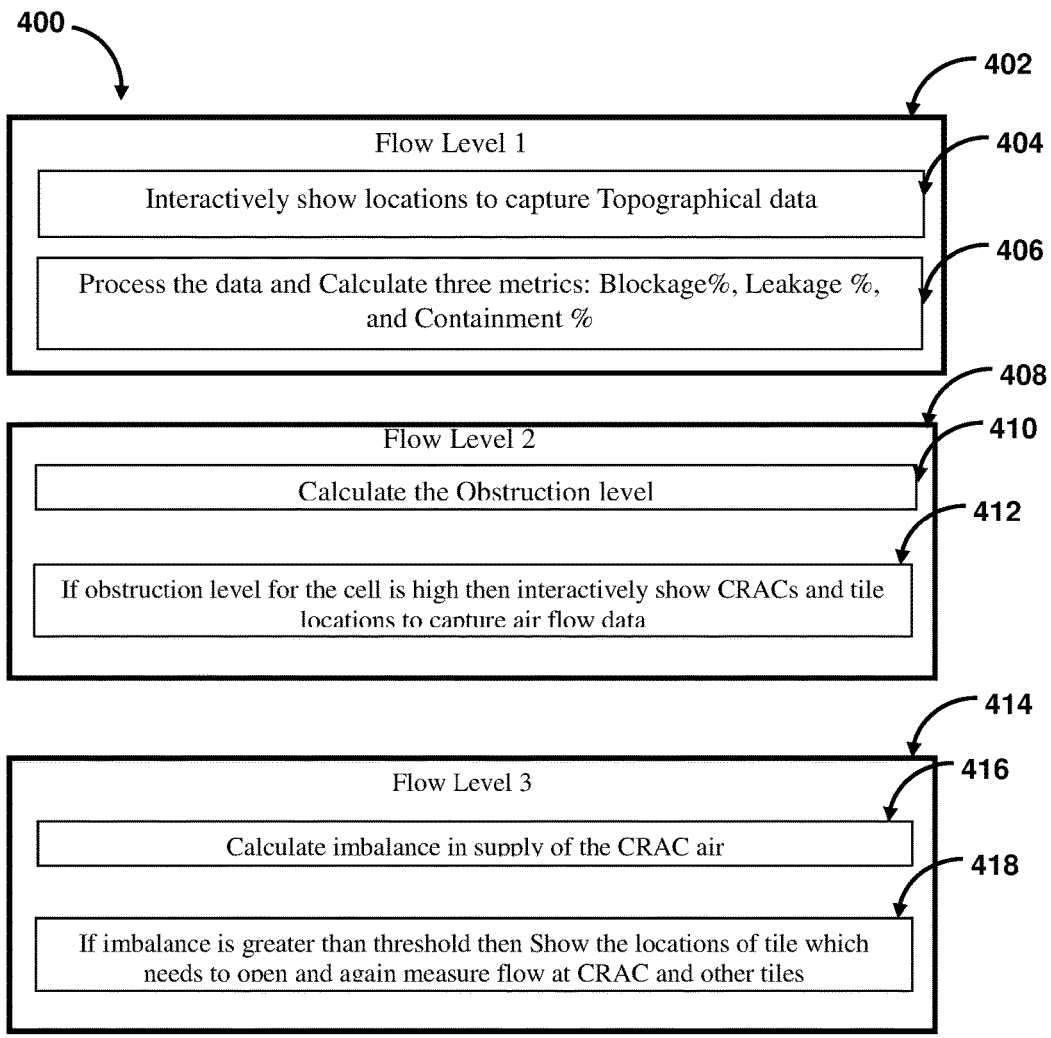
FIGS. 4 and 5 illustrate an exemplary embodiment of capturing CFD data associated with the data center.

FIG. 4 is a flow diagram 400 illustrating an exemplary process of capturing Flow data as the CFD data 308 in accordance with an embodiment of the present disclosure. Herein, the CFD data 308 refers to the Flow data that may required for the CFD analysis in order to facilitate the optimization of the cooling efficiency in the data center.

As illustrated, block 402 indicates capturing of CFD Flow level 1 data (similar to first level CFD data). The CFD Flow level 1 data involves the capturing of the CFD topographical data. The CFD topographical data indicates capturing details such as shape, size, and locations in the data center corresponding to blockages, leakages associated to equipments in the data center, details of containments in terms of size, type and level of containment, and the like. As shown, at block 404, the system 102 interactively displays the locations on the I/O interface 204 for capturing the CFD Flow level 1 data. Further, at block 406, the CFD Flow level 1 data is processed in order to compute first flow level metrics (similar to first level CFD metrics as described above). In one embodiment, the first flow level metrics computed may comprise Blockage %, Leakage %, Containment %, and the like as shown in FIG. 4. In one embodiment, the capturing of the CFD Flow level 1 data and the computing of the first flow level metrics is implemented by the data processing module 214. After the computation of the first flow level metrics, the data processing module 214 may proceed for capturing of CFD Flow level 2 as described further.

As illustrated, block 408 indicates capturing of the CFD Flow level 2 data (similar to second level CFD data). The CFD Flow level 2 data may be captured based on the first flow level metrics computed. Specifically, at block 410, processing of the first flow level metrics is done to calculate an Obstruction Level for each cell of the plurality of cells. In one embodiment, the obstruction level is calculated by multiplying a weight assigned for each of the first flow level metrics. In one example, consider the weight assigned to the Blockage %, the Leakage %, and the Containment % may be 0.4, 0.2, and 0.4 respectively. In this example, consider the obstruction level is calculated by summing each of these metrics. Then, at block 412, based on the obstruction level, CFD cells corresponding to which the capturing of the CFD Flow level 2 data is to be captured may be identified. More particularly, in this example, the cells having the obstruction level >0.7 are to be identified as the CFD cells for which the capturing of the CFD flow level 2 data is required. In an embodiment, the system 102, via the data visualization module, may be configured to identify CRACs and tile locations where the capturing of the CFD flow level 2 data comprising flow level from the CRACs and tile flow data is required. It may be realized and appreciated by a person skilled in art that since only few CRACs and tiles may be indicated as locations for the capturing CFD flow level 2 data, thus the data captured will be reduced, thereby facilitating conservation of the storage space of the system 102.

Further, as illustrated in FIG. 4, block 414 indicates capturing of CFD Flow level 3 data (similar to third level CFD data). The CFD Flow level 3 data may be captured based on the processing of the CFD flow level 2 data captured corresponding to the CFD cells. In particular, at block 416, for each cell of the CFD cells, imbalance in supply of the CRAC air may be calculated. The imbalance in the supply of the CRAC air may be one of the second level CFD metrics. In one embodiment, the Imbalance in the supply of the CRAC air may be calculated based on determining the ratio of actual flow supply to the rated air flow for CRACs, wherein the actual flow supply and the rater air flow for the CRACs may be determined based on the CFD Flow level 2 data. Further, based on the imbalance in the supply of the CRAC air calculated, the data processing module 214 may be configured to identify a sub-set of CFD cells corresponding to which the CFD Flow level 3 data may be captured. In one example, consider that the cells showing the imbalance value greater than a pre-defined threshold value are to be selected for capturing the CFD Flow level 3 data, and then such cells will be interactively shown in order to proceed for the capturing of the CFD Flow level 3 data. In one embodiment, the system 102 may display the locations of tiles which need to be temporary removed and measure flow at CRAC and other tiles again. It may be appreciated by a person skilled in art that since only few tiles may be indicated as locations for the capturing CFD flow level 3 data, thus the data captured will be reduced, thereby facilitating conservation of the storage space of the system 102.

Figure 5:
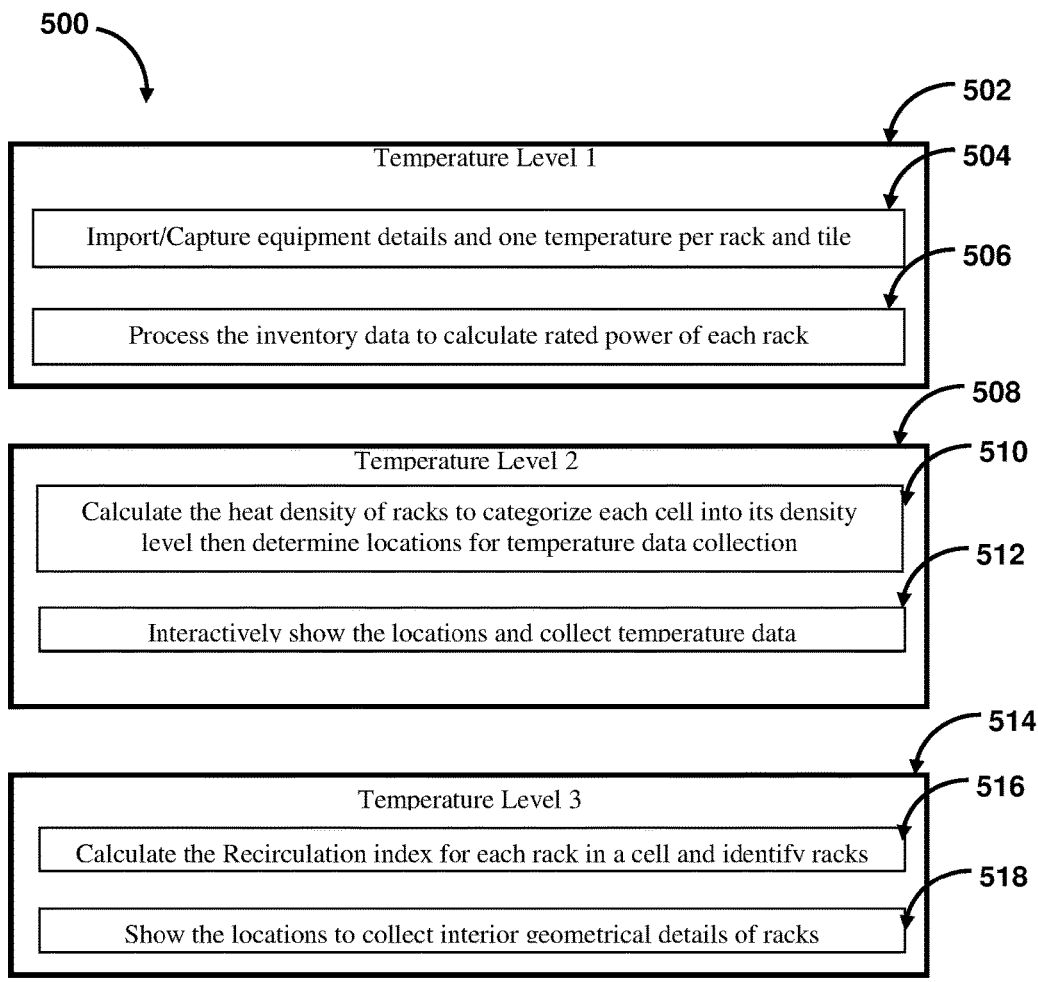

FIG. 5 is a flow diagram 500 illustrating an exemplary process of capturing temperature data as the CFD data 308 in accordance with an embodiment of the present disclosure. Herein, the CFD data 308 refers to the temperature data that may required for the CFD analysis in order to facilitate the optimization of the cooling efficiency in the data center.

As illustrated, block 502 indicates capturing of CFD temperature level 1 data (similar to first level CFD data). The CFD temperature level 1 data involves the capturing of equipment details such as inventory data as prescribed by the manufacturer for each type of equipment including racks, servers, and CRACs present in the data center. As shown, at block 504, the system 102 interactively displays the locations on the I/O interface 204 by identifying cells or the CFD cells, corresponding to which the CFD temperature level 1 data may be captured and/or imported. Further, at block 506, the CFD temperature level 1 data is processed in order to compute first temperature level metrics (similar to first level CFD metrics). In one embodiment, the first temperature level metrics computed may comprise rated power corresponding to each rack present in each cell. Specifically, the data processing module 214 may process the inventory details in order to capture power data for each server in a rack by referring inventory data stored in the database 220. Then, in one embodiment, the total rated power of the rack is calculated by summing of power for all servers present in the said rack. In one embodiment, the capturing of the CFD temperature level 1 data and the computing of the first temperature level metrics is implemented by the data processing module 214. After the computation of the first temperature level metrics, the data processing module 214 may proceed for the capturing of the CFD temperature level 2 as described further.

As illustrated, block 508 indicates capturing of CFD temperature level 2 data (similar to second level CFD data). The CFD temperature level 2 data may be captured based on the first temperature level metrics computed. Specifically, at block 510, heat density of racks may be calculated in order categorize each cells of the data center based on density levels. The heat density may be calculated based on the rated power computed for each rack. More particularly, in one embodiment, the heat density may indicate a ratio of summation of rated power of all the racks in a cell to the number of racks in the cell. Further, in one example, the categorization of the cells based on the heat density levels may be done in a manner such that, cells having the heat density levels 0-1, 1-3 and >3 may be categorized into low, medium and high categories respectively. Further, the data processing module 214 may determine the granularity and locations for the capturing of the CFD temperature level 2 data. As illustrated, at block 512, the locations may be interactively displayed on the I/O interface 204 via the data visualization module 324 in order to capture the CFD temperature level 2 data. Since, the data processing module 214 enables identifying key areas/locations/cells corresponding to which the CFD temperature level 2 data is to be captured, therefore, the data captured may be substantially reduced, which in turn facilitates in conserving the storage space of the system 102. In one example, the CFD temperature level 2 data includes the temperatures measured corresponding to each rack and tile for relatively longer time interval. Further, the temperatures corresponding to each rack may be for measured at more than one location of each rack.

Further, as illustrated in FIG. 5, block 514 indicates capturing of CFD temperature level 3 data (similar to third level CFD data). The CFD temperature level 3 data may be captured based on the processing of the CFD temperature level 2 data captured corresponding to the CFD cells. In particular, at block 516, for each cell of the CFD cells, recirculation index (similar to second level CFD metrics) may be calculated based on the processing of the CFD temperature level 2 data for each rack in a cell using following formula:

$$\text{Recirculation Index} = \text{Rack temperature} - \text{Tile temperature}$$

The calculation of the recirculation index enables in the identification of sub-set of the CFD cells corresponding to which the CFD temperature level 3 data is to be captured. More particularly, the recirculation index may enable to identify racks for which interior geometrical details in form of the CFD temperature Level 3 data may be required. Thus, the number of racks requiring the capturing of the CFD temperature level 3 data will be less after the identifications of the sub-set of the CFD cells. In one example, the interior geometrical details may include the exact opening, blockage and server position as well as size of the server in the rack. As illustrated, at block 518, the locations may be interactively displayed on the I/O interface 204 via the data visualization module 324 in order to capture the CFD temperature level 3 data. Since, the data processing module 214 enables identifying key areas/locations/cells corresponding to which the CFD temperature level 3 data is to be captured, therefore, the data captured may be substantially reduced, which in turn facilitates in conserving the storage space of the system 102.

In an embodiment of the present disclosure, the preliminary data, the first level thermal assessment data, the second level thermal assessment data, the first level CFD data, the second level CFD data and the third level CFD data may be captured using a sensor, a hand-held sensor, or a data logger, collectively referred hereinafter as data capturing devices. In one implementation, the system 102 may communicatively interface with the data capturing devices in order to capture the data via the data processing module 214. In another implementation, the user associated with one of the user devices 104 may access the data captured by the data capturing devices and then transmit the data to the system 102.

Data Interfacing Module 216

After the capturing of the thermal assessment data 306 and the CFD data 308, the data interfacing module 216 as shown in FIG. 3 may be configured to facilitate the optimization of the cooling efficiency of the data center using at least one of the thermal assessment data 306 and the CFD data 308. Specifically, the data interfacing module 216 may transmit the thermal assessment data 306 and the CFD data 308 to the external analysis tool 320 for the facilitation of the optimization of the cooling efficiency of the data center. The thermal assessment data 306 may comprise the first level thermal assessment data and the second level thermal assessment data. Further, the CFD data 308 may comprise the first level CFD data, the second level CFD data and the third level CFD data. In one aspect, the external analysis tool 320 may be capable of performing the Computational Fluid Dynamics (CFD) analysis using the first level CFD data, the second level CFD data and the third level CFD data. In another aspect, the external analysis tool 320 may be capable of performing the thermal assessment using the first level thermal assessment data and the second level thermal assessment data. In one embodiment, the external analysis tool 320 may perform the at least one of the thermal assessment and the CFD analysis based on methods and systems described in an Indian Patent Application 3158/MUM/2013, incorporated herein as a reference.

In one embodiment of the present disclosure, the data including the layout 302, the preliminary data 304, the thermal assessment data 306 and the CFD data 308 may be stored in the form of the objects 312. Any changes made to any of the data during the entire capturing and the processing may be written to the objects 312. The storage module 314 may enable to save these objects 312 in the memory of the system. The storage module 314 may convert each object into a standard notation like 'JavaScript Object Notation' (JSON), a lightweight data-interchange format, and may dump the converted information into Data file 316. The data saved into the Data file 316 using the storage module 314 may be converted from the JSON notation into the objects 312 by using the load module 318, enabling to continue working and/or handling the data saved into the Data file 316 last time. In some embodiments, the storage module 314 may convert each object into various standard notations known in the art, and is not limited to the standard notation "JSON" as described in this particular embodiment.

Data Visualization Module 324

In an embodiment, the data visualization module 324 may display a particular type of data to be captured and guidelines for the capturing of the data of the particular type. Further, the data visualization module 324 may display properties associated to the type of data that is be captured. Further, the data visualization module 324 may display the appropriate cells on the layout 302 for the capturing of the CFD data 308 and the thermal assessment data 306. Furthermore, the data visualization module 324 may facilitate the user to generate the layout 302, as described earlier.

Exemplary embodiments discussed above may provide certain advantages. Though not required to practice aspects of the disclosure, these advantages may include those provided by the following features.

Some embodiments enable the optimization of the cooling efficiency by capturing data optimally required for performing analysis of the current state of the data center, thereby conserving the storage space of the system 102.

Some embodiments enable to optimize the processing speed and/or reduce the processing time of the system 102 facilitating the optimization of the cooling efficiency of the data center due to reduction in the amount of the data captured.

Some embodiments enable identification of relevant cells on the layout corresponding to which the data is desired to be captured, thereby avoiding the capturing of any redundant data that may not be useful for performing the analysis of the current state of the data center.

Figure 6:
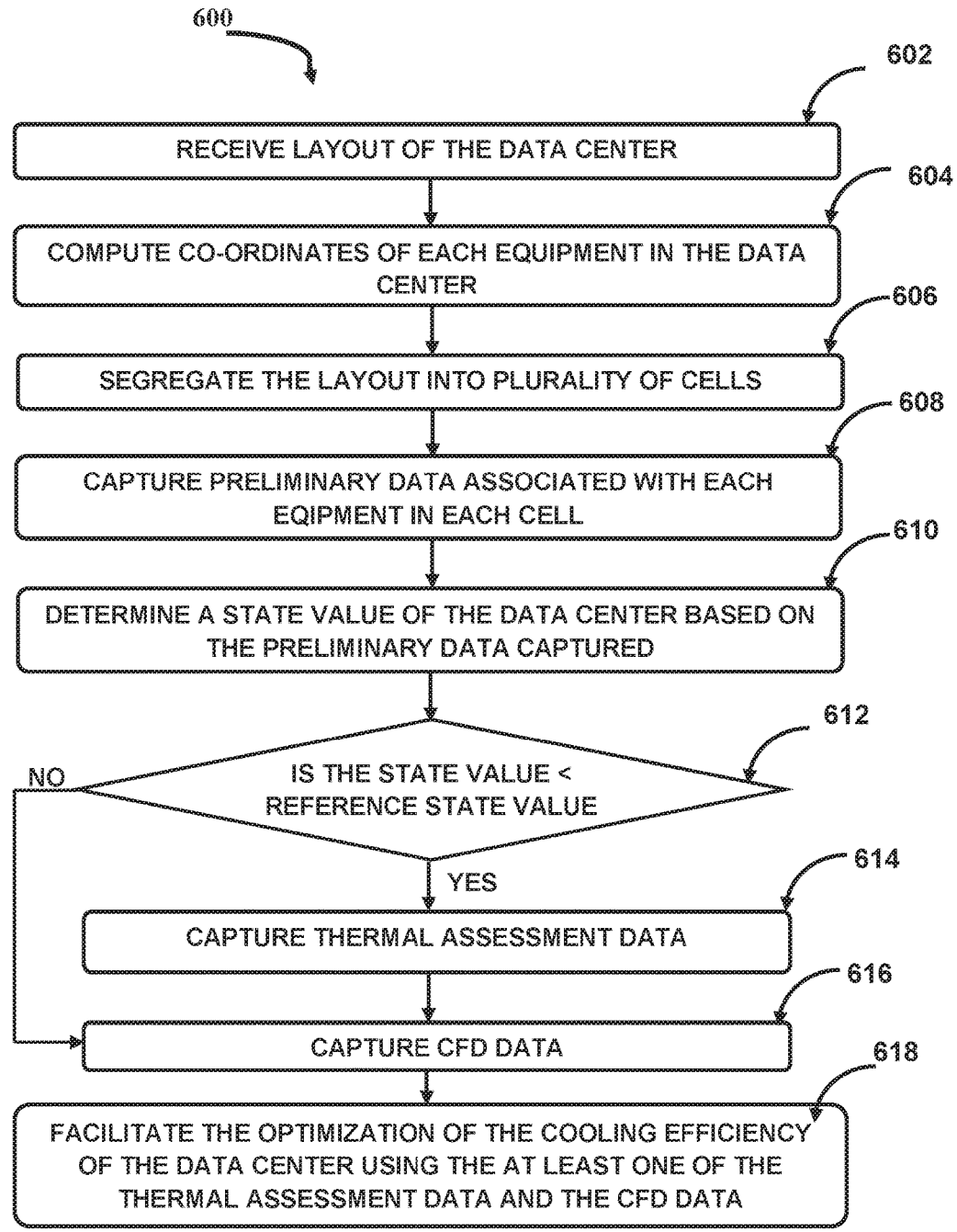
FIGS. 6, 7 and 8 illustrate a method for facilitating optimizing cooling efficiency of a data center, in accordance with an embodiment of the present disclosure.

Referring now to FIG. 6, a method 600 for facilitating optimizing cooling efficiency of a data center is shown, in accordance with an embodiment of the present disclosure. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the disclosure described herein. Furthermore, the method can be implemented in any suitable hardware, software, firmware, or combination thereof. However, for ease of explanation, in the embodiments described below, the method 600 may be considered to be implemented as described in the system 102.

At block 602, layout of the data center may be received. In one implementation, the layout may be received by the geometry processing module 212.

At block 604, co-ordinates of each equipment in the data center may be computed. In one implementation, the co-ordinates may be computed using the geometry processing module 212.

At block 606, the layout may be segregated into a plurality of cells. Each cell of the plurality of cells may comprise plurality of equipments in the data center. In one implementation, the layout may be segregated into said plurality of cells using the geometry processing module 212.

At block 608, preliminary data associated with each equipment of the plurality of cells may be captured. In one implementation, the preliminary data may be captured using the data processing module 214.

At block 610, a state value of the data center may be determined based on the preliminarily data captured at block 608. In one implementation, the preliminary data may be captured using the data processing module 214.

At block 612, the state value may be compared with a reference state value. When the state value is less than the reference state value, the method 600 may proceed to block 614; else the method may proceed to block 616.

At block 614, thermal assessment data required to be applicable for performing thermal assessment of the data center may be captured. The thermal assessment data may be captured using a method 700 as described in FIG. 7. In one implementation, the thermal assessment data may be captured using the data processing module 214.

At block 616, CFD data required to be applicable for performing Computational Fluid Dynamics (CFD) analysis of the data center may be captured. The CFD data may be captured using a method 800 as described in FIG. 8. In one implementation, the CFD data may be captured using the data processing module 214.

At block 618, the optimization of the cooling efficiency of the data center may be facilitated using the at least one of the thermal assessment data and the CFD data. In one implementation, the optimization of the cooling efficiency of the data center may be facilitated by the data interfacing module 216. In this implementation, the data interfacing module 216 may transmit the thermal assessment data and the CFD data to the external analysis tool 320 for performing the thermal assessment and the Computational Fluid Dynamics (CFD) analysis respectively in order to facilitate the optimization of the cooling efficiency of the data center.

Figure 7:
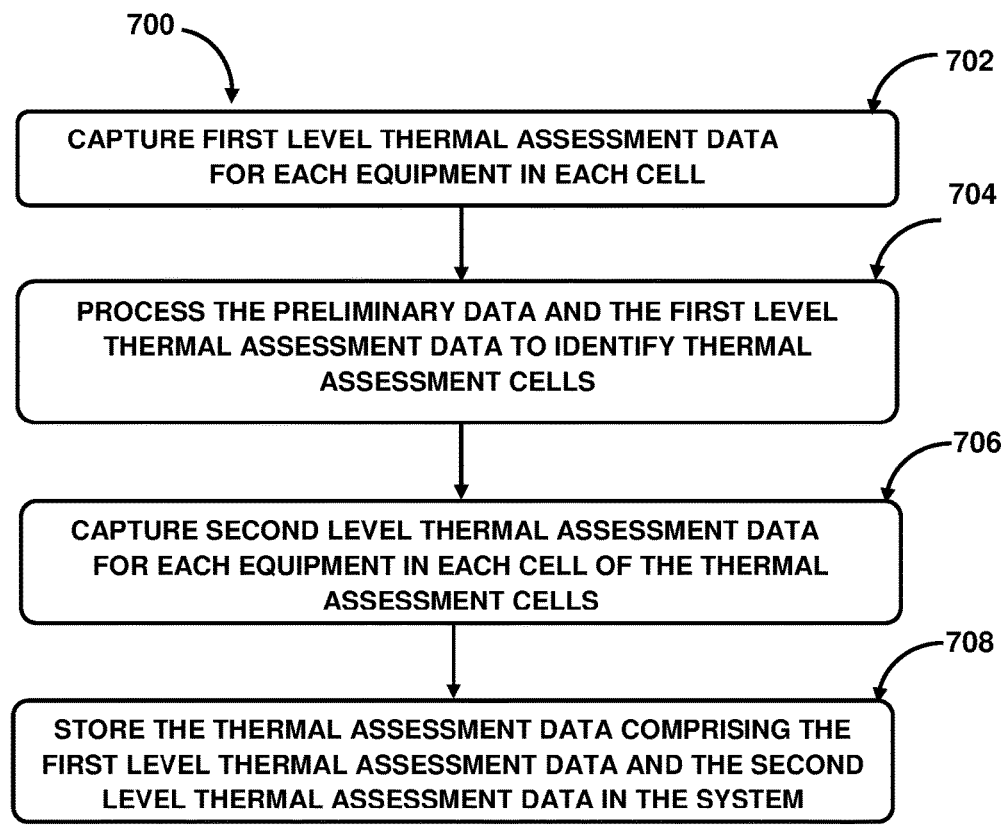

Referring now to FIG. 7, a method 700 for the capturing of the thermal assessment data is shown, in accordance with an embodiment of the present disclosure. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the disclosure described herein. Furthermore, the method can be implemented in any suitable hardware, software, firmware, or combination thereof. However, for ease of explanation, in the embodiments described below, the method 700 may be considered to be implemented as described in the system 102.

At block 702, first level thermal assessment data for each equipment in each cell of the plurality of cells may be captured.

At block 704, the preliminary data and the first level thermal assessment data may be processed in order to identify thermal assessment cells.

At block 706, second level thermal assessment data corresponding to each equipment present in each cell of the thermal assessment cells may be captured.

At block 708, the thermal assessment data comprising the first level thermal assessment data and the second level thermal assessment data may be stored in the memory of the system 102.

Figure 8:
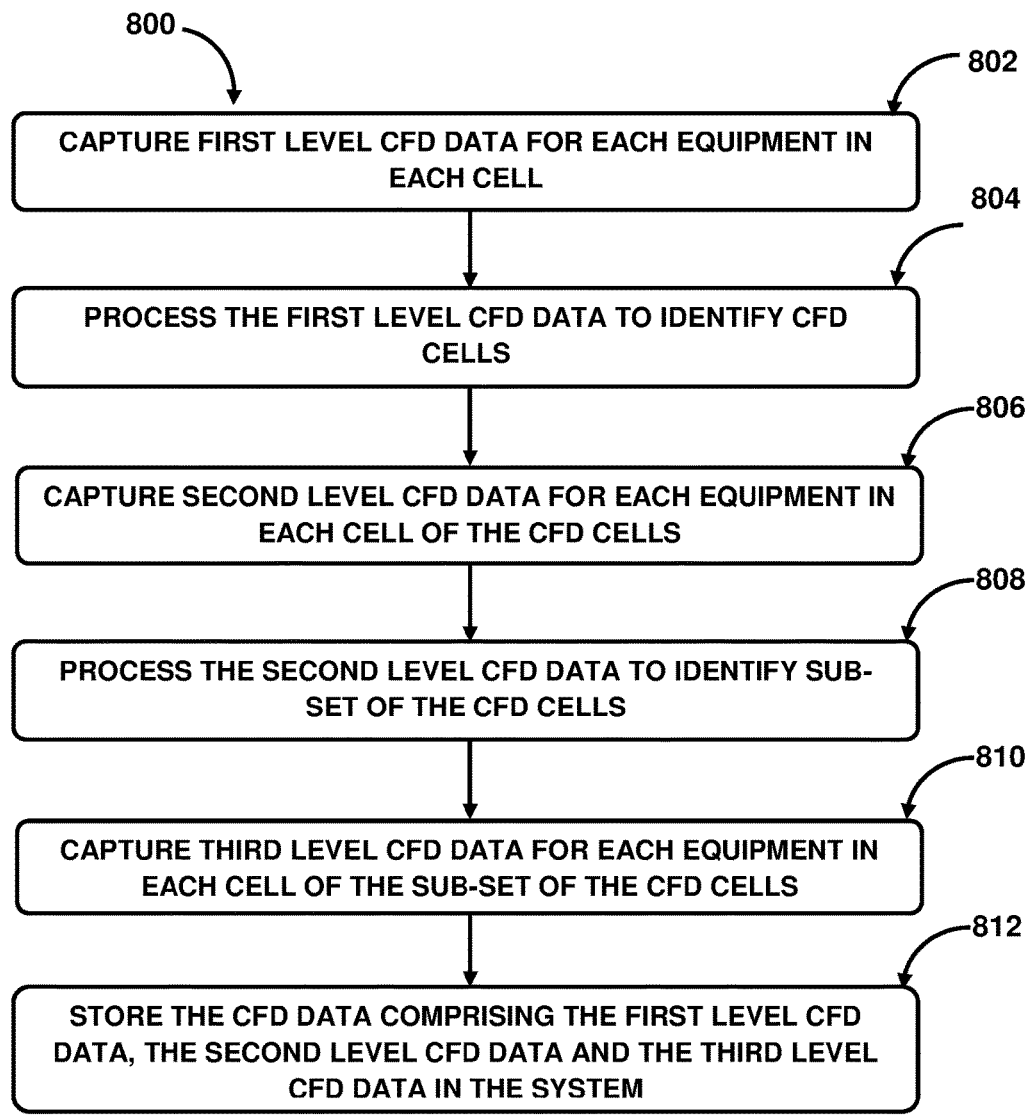

Referring now to FIG. 8, a method 800 for the capturing of the CFD data is shown, in accordance with an embodiment of the present disclosure. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800 is described is not intended to be construed as a limitation, and any number of the described method blocks can be combined in any order to implement the method 800 or alternate methods. Additionally, individual blocks may be deleted from the method 800 without departing from the spirit and scope of the disclosure described herein. Furthermore, the method can be implemented in any suitable hardware, software, firmware, or combination thereof. However, for ease of explanation, in the embodiments described below, the method 800 may be considered to be implemented as described in the system 102.

At block 802, first level CFD data for each equipment in each cell of the plurality of cells may be captured.

At block 804, the first level CFD data may be processed in order to identify CFD cells.

At block 806, second level CFD data corresponding to each equipment present in each cell of the CFD cells may be captured.

At block 808, the second level CFD data may be processed in order to identify a sub-set of the CFD cells.

At block 810, third level CFD data corresponding to each equipment present in each cell of the sub-set of the CFD cells may be captured.

At block 812, the CFD data comprising the first level CFD data, the second level CFD data and the third level CFD data may be stored in the memory of the system 102.

Although implementations for methods and systems for facilitating the optimization of the cooling efficiency of the data center have been described in language specific to structural features and/or methods, it is to be understood that the appended claims are not necessarily limited to the specific features or methods described. Rather, the specific features and methods are disclosed as examples of implementations for facilitating the optimization of the cooling efficiency of the data center.

The invention claimed is:

1. A method for facilitating optimizing cooling efficiency of a data center, the method comprising:
   receiving a layout of the data center;
   computing, via a processor, co-ordinates of each equipment of a plurality of equipments associated with the data center, wherein the co-ordinates are computed based upon a distance of each equipment from a reference location in the data center;
   segregating, via the processor, the layout into a plurality of cells based on the layout, wherein the plurality of cells comprises the plurality of equipments;
   capturing preliminary data associated with the data center;
   determining, via the processor, a state value of the data center based upon the preliminary data;
   when the state value is less than a reference state value,
      capturing first level thermal assessment data for each equipment in the data center,
      processing, via the processor, the preliminary data and the first level thermal assessment data in order to identify thermal assessment cells from the plurality cells, and capturing second level thermal assessment data corresponding to equipments present in the thermal assessment cells;
capturing first level CFD data for each equipment in the data center;
processing, via the processor, the first level CFD data in order to identify CFD cells from the plurality of cells;
capturing second level CFD data corresponding to equipments present in the CFD cells;
processing, via the processor, the second level CFD data in order to identify a sub-set of the CFD cells;
capturing third level CFD data corresponding to equipments present in the sub-set of the CFD cells; and
transmitting at least one of the first level thermal assessment data, the second level thermal assessment data, the first level CFD data, the second level CFD data and the third level CFD data to an external analysis tool, wherein the external analysis tool is capable of performing at least one of a thermal assessment and a Computational Fluid Dynamics (CFD) analysis using the at least one of the first level thermal assessment data, the second level thermal assessment data, the first level CFD data, the second level CFD data and the third level CFD data, thereby facilitating the optimization of the cooling efficiency of the data center.

2. The method of claim 1, wherein the plurality of equipments comprises a Computer Room Air Conditioner (CRAC), a networking device, a storage device, a switch, a heat dissipating device, and a rack housing the heat dissipating device.

3. The method of claim 2, wherein the preliminary data comprises information of the plurality of equipments, information of racking practices of the rack, power consumed by the data center, power consumed by the one or more equipments, operational parameters of the plurality of equipments, leakage in a plenum of the data center, blockage in the plenum of the data center, openings in the rack, temperature associated with each equipment, air velocity associated with each equipment.

4. The method of claim 1, wherein the segregation of the layout is based on, size of each cell of the plurality of cells, or an aisle in the data center or geometry associated with the data center.

5. The method of claim 1, wherein the first level thermal assessment data is associated with each cell of the plurality of cells, and wherein the first level thermal assessment data comprises first level thermal assessment topographical data, first level temperature data, and first level flow data, and wherein the first level thermal assessment topographical data is associated with at least one of a leakage, a blockage and an opening corresponding to each cell of the plurality of cells.

6. The method of claim 5, wherein the processing of the data and the first level thermal assessment data enables in computing thermal assessment metrics, and wherein the thermal assessment metrics facilitates in the identification of the thermal assessment cells.

7. The method of claim 1, wherein the second level thermal assessment data is associated with each cell of the thermal assessment cells, and wherein the second level thermal assessment data comprises second level thermal assessment topographical data, second level temperature data, and second level flow data, wherein the second level thermal assessment topographical data is associated with at least one of a leakage, a blockage and an opening corresponding to each cell of the thermal assessment cells.

8. The method of claim 1, wherein the first level CFD data comprises CFD topographical data, and wherein the CFD topographical data is associated with at least one of a leakage, a blockage and a containment corresponding to each cell of the plurality of cells.

9. The method of claim 8, wherein the processing of the first level CFD data enables computing first level CFD metrics, and wherein the first level CFD metrics facilitates in the identification of the CFD cells.

10. The method of claim 1, wherein the second level CFD data comprises first level CFD temperature data and first level CFD flow data, and wherein the first level CFD temperature data and the first level CFD flow data are obtained corresponding to each cell of the CFD cells.

11. The method of claim 10, wherein the processing of the second level CFD data enables in computing second level CFD metrics, and wherein the second level CFD metrics facilitates in the identification of the sub-set of the CFD cells.

12. The method of claim 1, wherein the third level CFD data comprises second level CFD temperature data and second level CFD flow data, and wherein the second level CFD temperature data and the second level CFD flow data are obtained corresponding to each cell of the sub-set of the CFD cells.

13. The method of claim 1, wherein the first level CFD data, the second level CFD data and the third level CFD data are captured directly, when the state value is greater than or equal to the reference state value, or the first level CFD data, the second level CFD data and the third level CFD data are captured after the capturing of the first level thermal assessment data and the second level thermal assessment data, when the state value is less than the reference state value.

14. A system for facilitating optimizing cooling efficiency of a data center, the system comprising:
a processor; and
a memory coupled to the processor, the memory comprising a plurality of modules capable of being executed by the processor, wherein the plurality of modules comprises:
a geometry processing module configured to
receive a layout of the data center;
compute co-ordinates of each equipment of a plurality of equipments associated with the data center, wherein the co-ordinates are computed based upon a distance of each equipment from a reference location in the data center, and
segregate the layout into a plurality of cells based on the layout, wherein the plurality of cells comprises the plurality of equipments;
a data processing module configured to,
capture preliminary data associated with the data center;
determine a state value of the data center based upon the preliminary data;
when the state value is less than a reference state value,
capture first level thermal assessment data for each equipment in the data center,
process the preliminary data and the first level thermal assessment data in order to identify thermal assessment cells from the plurality cells, and
capture second level thermal assessment data corresponding to equipments present in the thermal assessment cells, wherein the data processing module is further configured to
- capture first level CFD data for each equipment in the data center,
- process the first level CFD data in order to identify CFD cells from the plurality of cells,
- capture second level CFD data corresponding to equipments present in the CFD cells,
- process the second level CFD data in order to identify a sub-set of the CFD cells, and
- capture third level CFD data corresponding to equipments present in the sub-set of the CFD cells; and a data interfacing module configured to transmit at least one of the first level thermal assessment data, the second level thermal assessment data, the first level CFD data, the second level CFD data and the third level CFD data to an external analysis tool, wherein the external analysis tool is capable of performing at least one of a thermal assessment and a Computational Fluid Dynamics (CFD) analysis using the at least one of the first level thermal assessment data, the second level thermal assessment data, the first level CFD data, the second level CFD data and the third level CFD data, thereby facilitating the optimization of the cooling efficiency of the data center.

15. The system of claim 14, wherein the plurality of equipments comprises a Computer Room Air Conditioner (CRAC), a networking device, a storage device, a switch, a heat dissipating device, and a rack housing the heat dissipating device.

16. The system of claim 14, wherein the segregation of the layout is based on, size of each cell of the plurality of cells, or an aisle in the data center or geometry associated with the data center.

17. The system of claim 14, wherein the preliminary data, the first level thermal assessment data, the second level thermal assessment data, the first level CFD data, the second level CFD data and the third level CFD data are captured using a sensor, or a hand-held sensor, or a data logger.

18. A non-transitory computer program product having embodied thereon computer program instructions for facilitating optimizing cooling efficiency of a data center, the instructions comprising instructions for:

receiving a layout of the data center;
computing co-ordinates of each equipment of a plurality of equipments associated with the data center, wherein the co-ordinates are computed based upon a distance of each equipment from a reference location in the data center;
segregating the layout into a plurality of cells based on the layout, wherein the plurality of cells comprises the plurality of equipments;
capturing preliminary data associated with the data center;
determining a state value of the data center based upon the preliminary data;
when the state value is less than a reference state value,
- capturing first level thermal assessment data for each equipment in the data center,
- processing the preliminary data and the first level thermal assessment data in order to identify thermal assessment cells from the plurality cells, and
- capturing second level thermal assessment data corresponding to equipments present in the thermal assessment cells;
capturing first level CFD data for each equipment in the data center;
processing the first level CFD data in order to identify CFD cells from the plurality of cells;
capturing second level CFD data corresponding to equipments present in the CFD cells;
processing the second level CFD data in order to identify a sub-set of the CFD cells;
capturing third level CFD data corresponding to equipments present in the sub-set of the CFD cells; and
transmitting at least one of the first level thermal assessment data, the second level thermal assessment data, the first level CFD data, the second level CFD data and the third level CFD data to an external analysis tool, wherein the external analysis tool is capable of performing at least one of a thermal assessment and a Computational Fluid Dynamics (CFD) analysis using the at least one of the first level thermal assessment data, the second level thermal assessment data, the first level CFD data, the second level CFD data and the third level CFD data, thereby facilitating the optimization of the cooling efficiency of the data center.

* * * * *